Jan. 29, 1963 T. L. BERRY ET AL 3,075,292
TUBING CALIPERING INSTRUMENT
Filed Oct. 3, 1958 7 Sheets-Sheet 1
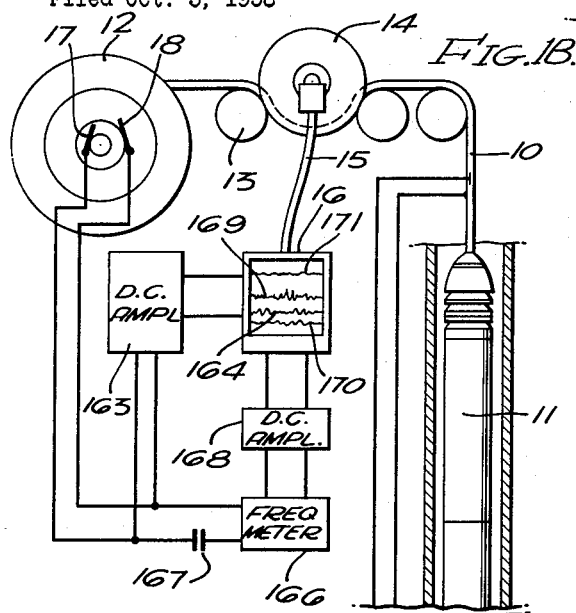
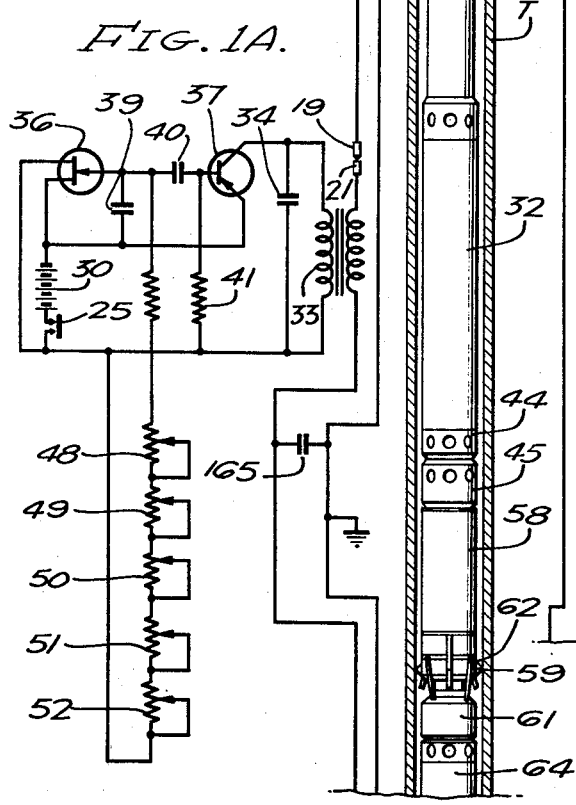
INVENTORS
THEODORE L. BERRY
WILLIAM R. GIESKE
BY
Hazard & Miller
ATTORNEYS

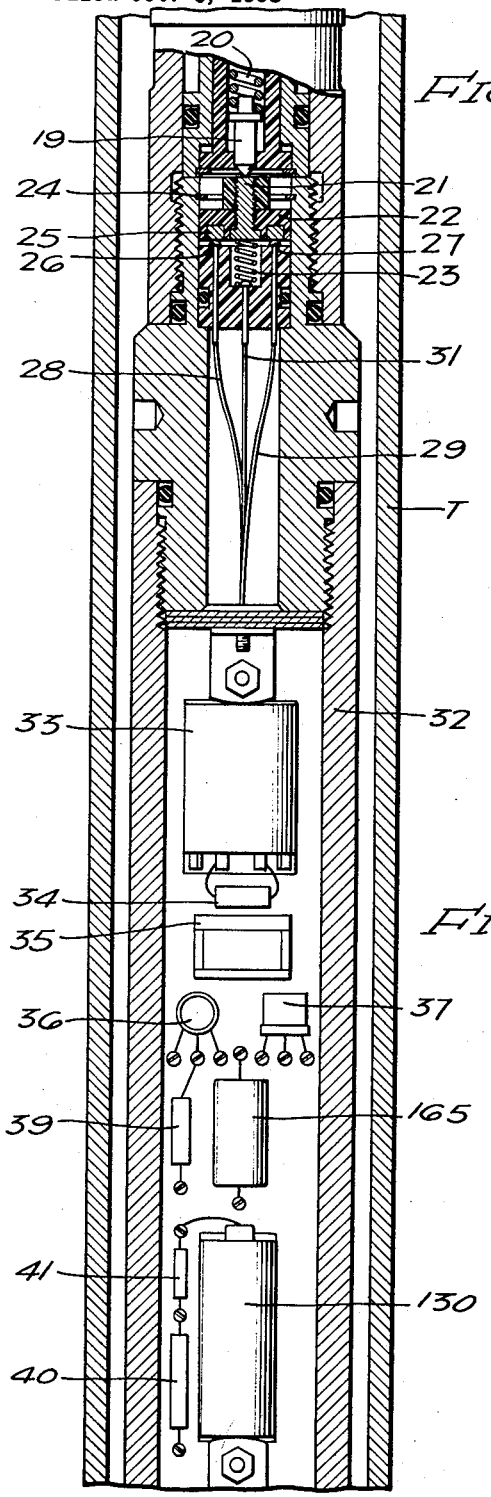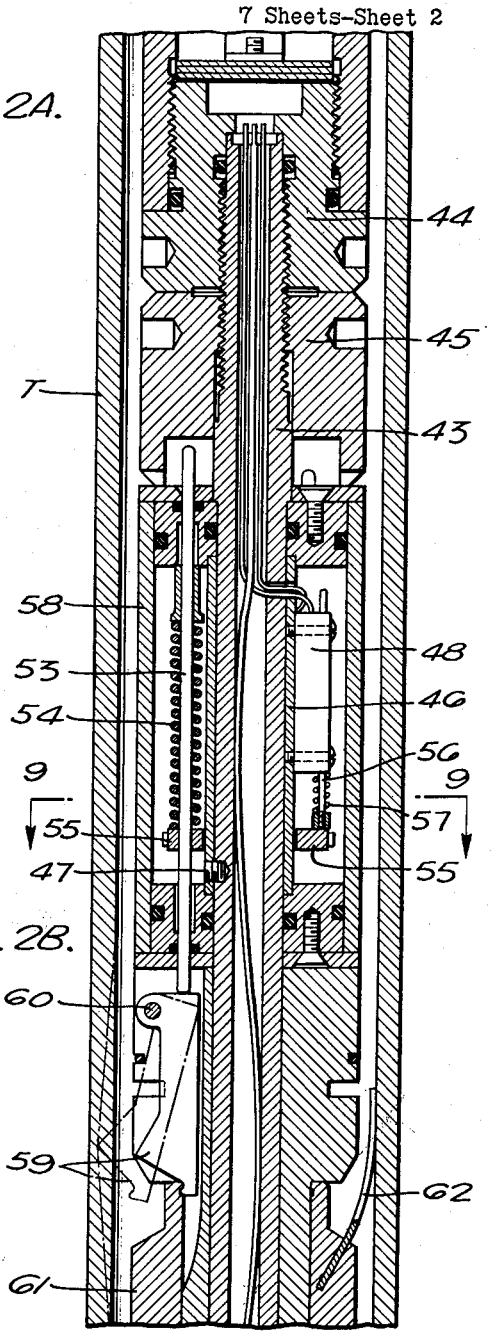

INVENTORS
THEODORE L. BERRY
WILLIAM R. GIESKE
BY Hazard & Miller
ATTORNEYS

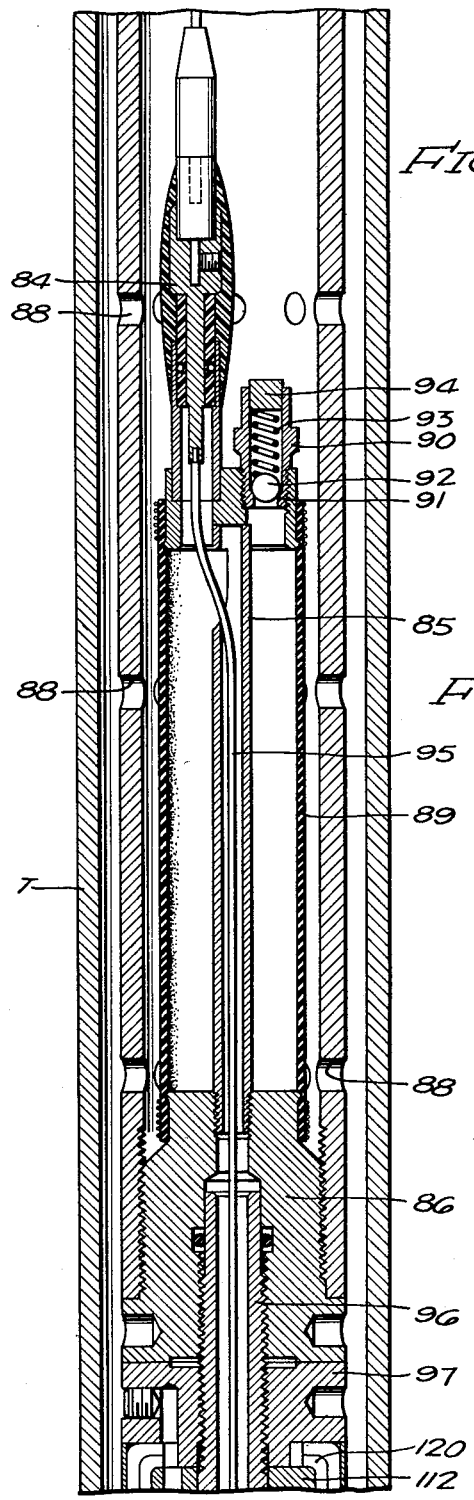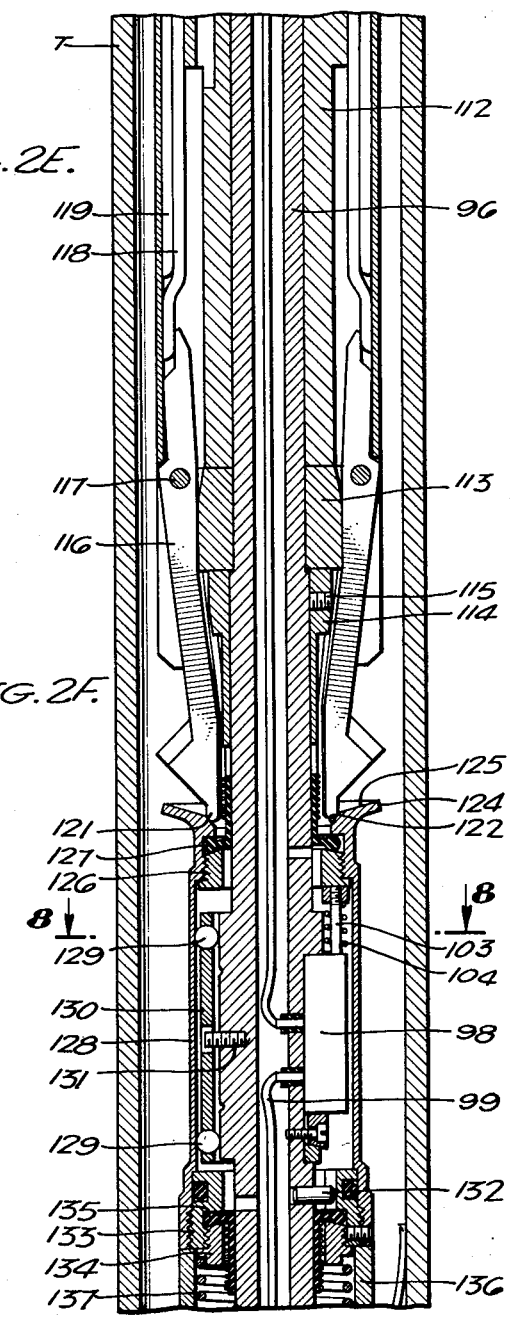

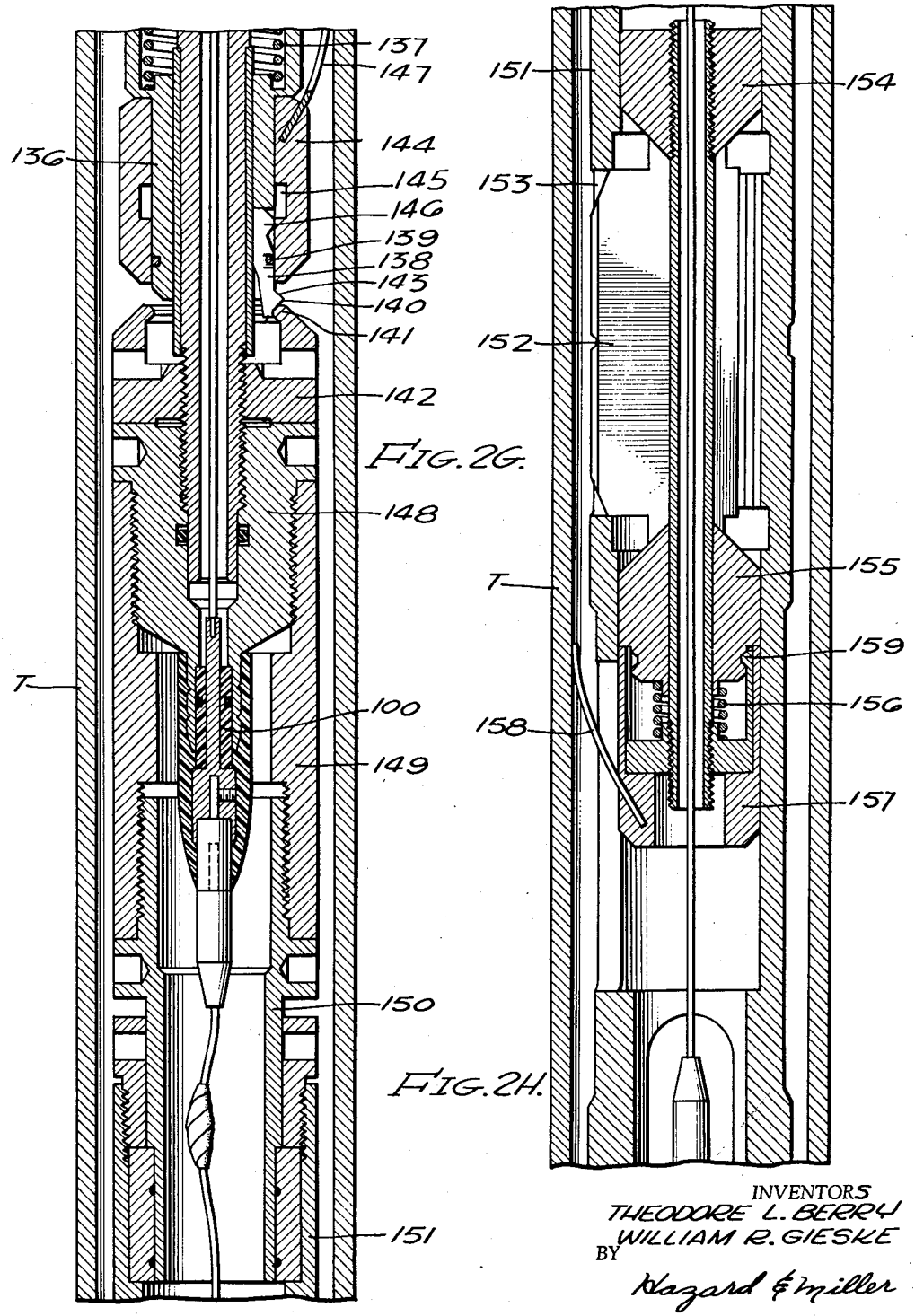

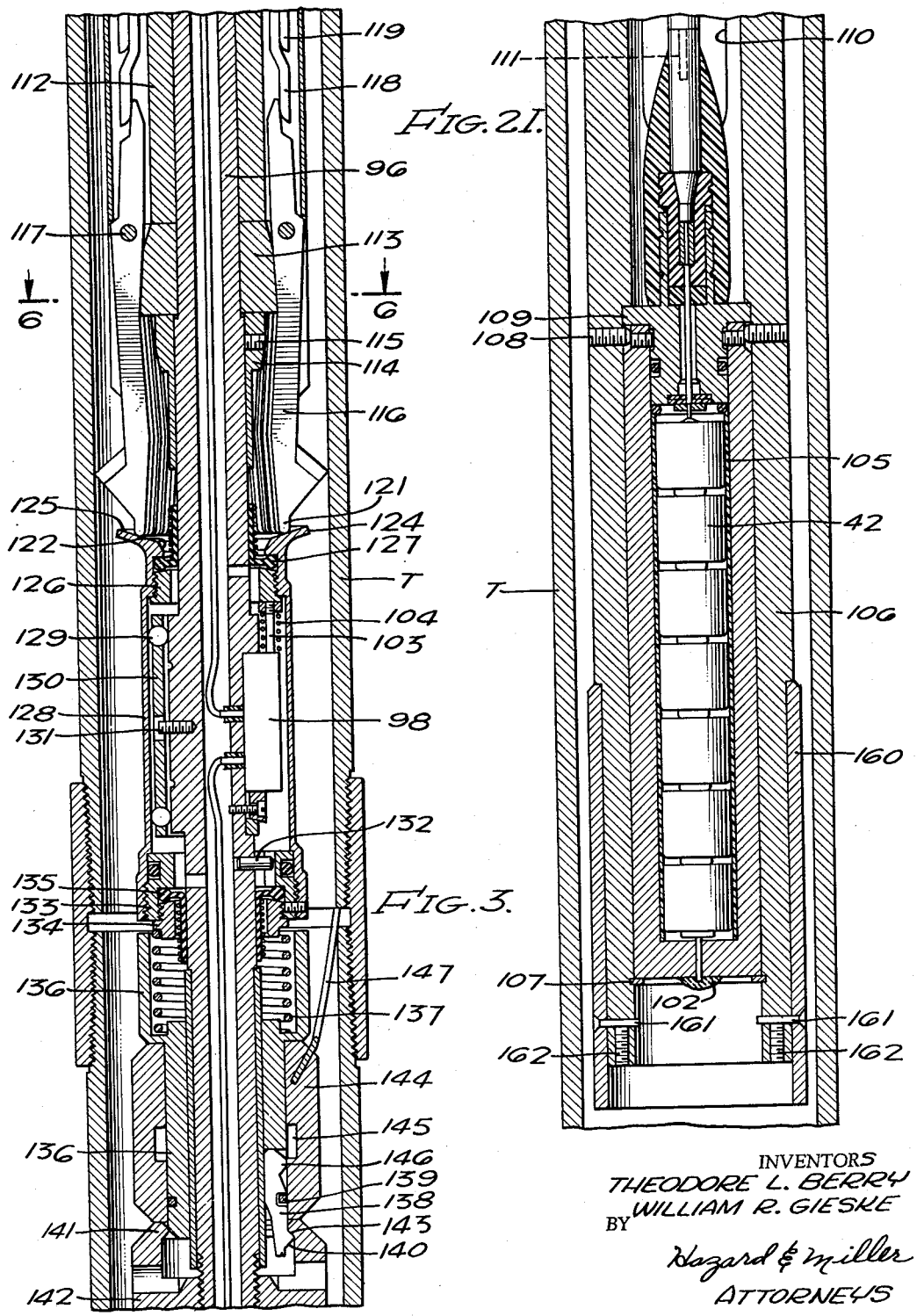

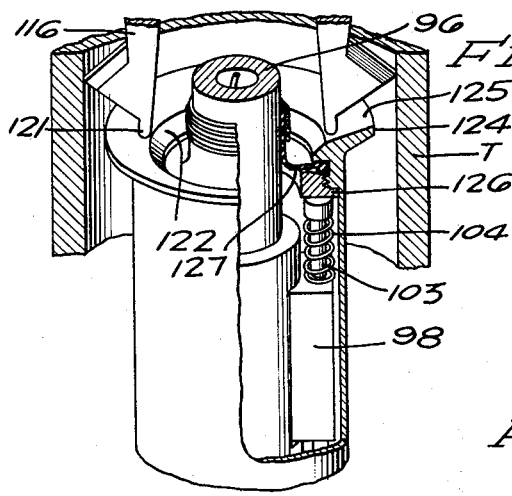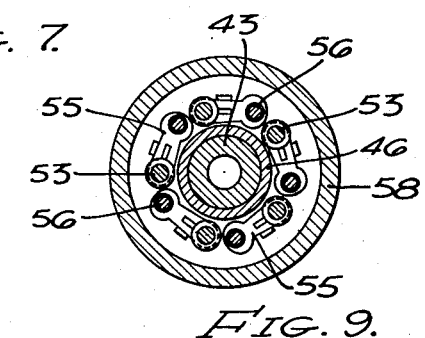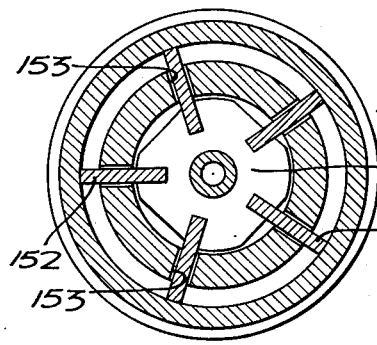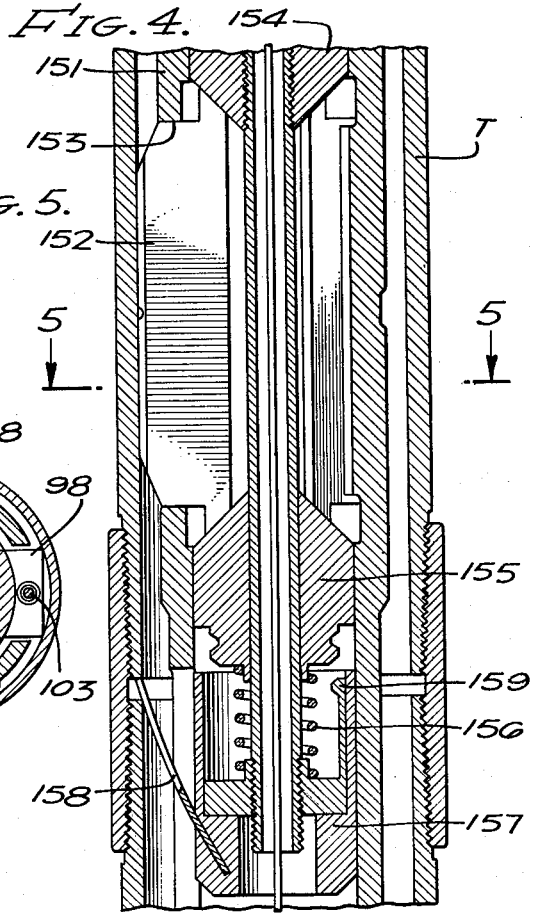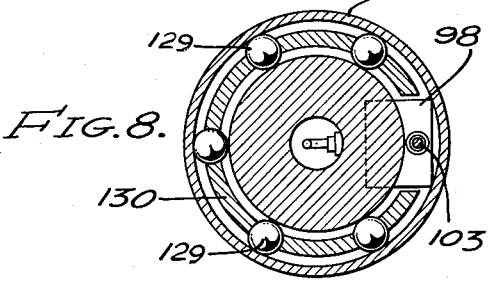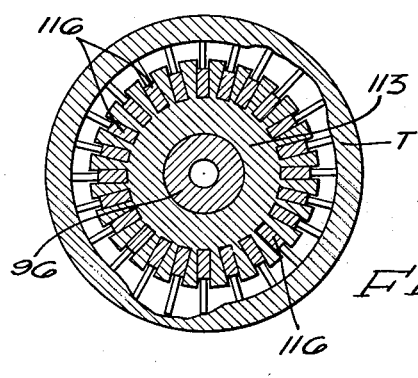
INVENTORS
THEODORE L. BERRY
WILLIAM R. GIESKE
BY Hazard & Miller
ATTORNEYS

United States Patent Office 3,075,292
Patented Jan. 29, 1963

3,075,292
TUBING CALIPERING INSTRUMENT
Theodore L. Berry, Santa Fe Springs, and William R. Gieske, Fullerton, Calif., assignors to The Ford Alexander Corporation, Santa Fe Springs, Calif., a corporation of California
Filed Oct. 3, 1958, Ser. No. 765,097
20 Claims. (Cl. 33—178)

This invention relates to a calipering instrument primarily designed for calipering the interior of a tubing or a casing in a well, but which is suitable for use in making internal measurements of other tubular articles under similar or analogous conditions.

Tubings and casings used in the production of gas and oil are subject to very severe wear in addition to the high pressure and temperature conditions that are frequently encountered in oil and gas wells. The tubing may also be subject to mechanical wear. This may be occasioned by the reciprocation of sucker rods in the tubing. Also, fluids passing through the tubing may carry abrasive particles which tend to abrade the interior of the tubing. In addition, mechanical wear may also be by or in the course of work-over operations. Corrosive conditions may also exist which tend to corrode the tubing. These may be due to corrosive fluids that may be present or may be due to electrolytic conditions.

The mechanical wear that is occasioned by sucker rods is frequently in the nature of longitudinal scoring on the interior of the tubing. Wear due to corrosion or electrolytic conditions may be in the form of individual pits or depressions in the wall of the tubing, and also may be in the form of an annular ring or annular groove which commonly occurs at the base of the upset at each end of a tubing section. The formation of the annular ring or annular groove about the interior of a tubing section is frequently referred to as "ring corrosion."

If the mechanical wear is not severe and is localized on one side of a tubing section, the remaining wall thickness elsewhere about the horizontal circumference is frequently sufficient in strength to render immediate replacement of the tubing section unnecessary. The same may be true where individual pits or depressions are formed as a result of corrosion or electrolytic action. However, if a multiplicity of individual pits or depressions occur around the same horizontal circumference or ring corrosion has occurred, the tubing section may be so weakened that it is about to fail.

It has been proposed to periodically caliper a tubing or casing while in the well and to compare records of the calipering done at different times for the purpose of determining the rate of deterioration, the nature of the deterioration, and also for the purpose of determining what if any remedial steps should be taken to prevent complete failure of the tubing.

Tubing calipers have heretofore been designed for the purpose of calipering the interiors of tubings while the tubings remainder in the well. Generally speaking, these tubing calipers have usually consisted of expansible feelers fingers which are urged outwardly into engagement with the interior of the tubing. If one or more feeler fingers is permitted by the tubing to expand outwardly beyond a determined limit a signal is communicated to the surface indicating that this has taken place. Sometimes more than a single predetermined limit is provided so that if the feeler fingers expand beyond a first predetermined limit and also beyond a second predetermined limit a distinguishable signal is communicated to the surface indicating that the second limit has been exceeded. Tubing calipers of this character are subject to the criticism that they do not and ordinarily cannot undertake to produce a reasonably accurate profile of the interior of the tubing. Instead, they merely indicate whether or not a first limit, a second limit, or a third limit of expansion of the feeler fingers has been exceeded. Also, they do not indicate whether a single finger has exceeded a predetermined limit or whether a plurality of fingers have exceeded the limit. If a single feeler finger has exceeded the predetermined limit, as may be occasioned by its entering a single isolated pit or depression, the remaining wall thickness of the tubing adjacent such pit or depression may be adequate to carry whatever load the tubing may be subjected to. On the other hand, if the signal transmitted to the surface is occasioned by a large plurality of feeler fingers entering a plurality of pits or depressions in close proximity to each other or by the entry of the feeler fingers into a ring or groove as in the case of ring corrosion, it is impossible to ascertain from the signal whether the tubing has been severely weakened by the annular groove or group of pits or whether only a single finger has entered a single isolated pit.

A primary object of the present invention is to provide an improved tubing caliper that can be lowered into a tubing or into a casing in a well and which can be drawn upwardly therethrough which will immediately and with a high degree of accuracy draw a profile record of the interior of the tubing. From such record it may be ascertained the depth to which a feeler finger may have expanded in a pit or depression, and also whether this expansion is occasioned by the entry of a single feeler finger into a single isolated pit or depression, or whether a plurality of fingers have simultaneously entered a ring or groove about the interior of the tubing. If the latter is the situation, the tubing section may require that immediate remedial steps be taken to prevent its failure. On the other hand, if only a single finger has expanded into a single isolated pit or depression no remedial steps may be necessary.

Another object of the invention is to provide a caliper which is of such design that the number of feeler fingers which can be employed may be materially increased, and which is of such design that manufacturing tolerances and fits in the linkages, connectors, levers, and the like which contribute to the inaccuracy of prior tools can be materially reduced, thus rendering the improved tool highly accurate. The larger the number of feeler fingers employed increases the area within the tubing that is being calipered and consequently produces a truer and more accurate record of the condition of the inside of the tubing.

Another object of the invention is to provide a tubing caliper in which an accurate profile of the interior of the tubing is instantly and simultaneously formed as the caliper is drawn upwardly through the tubing. Tubing calipers heretofore designed sometimes malfunction while they are being drawn upwardly through the tubing. When this occurs it is usually not known that the instrument has malfunctioned until the instrument has been completely drawn through the tubing and has been recovered. When malfunctioning of the instrument is then ascertained it is usually necessary to rerun the tool through the entire length of the tubing that is to be calipered.

The instrument embodying the present invention enables malfunctioning of the tool to be instantly ascertained so that the tool can be quickly withdrawn from the tubing, corrected, and rerun only from the depth at which the malfunctioning occurred, thus saving considerable valuable time as well as expense.

Another object of the invention is to provide a novel centralizing construction which will hold the groups of feeler fingers centered or in coaxial relationship to the tubing. Prior devices of this character have usually employed centralizing devices somewhat in the nature of belly springs which present outermost curved surfaces which engage the interior of the tubing. These curved surfaces are of course subject to wear as the caliper is lowered into the tubing and withdrawn therefrom, and as the centering device encounters smaller or larger than normal internal tubing diameters, the wear point tends to shift over the curve of the engaging surface. This shifting of the wear point tends to contribute to the inaccuracy of prior tubing calipers. Outwardly bowed or outwardly curved centralizing members frequently expand into the gaps within the collars of the tubing in an objectionable manner.

In the improved tubing caliper embodying the present invention the expansion members of the centralizing devices present outer edges or surfaces which are parallel to the axis of the tool and which are of substantial length so that the wear is evenly distributed thereover without shifting from one point to another. The length of engagement between the expansion members and the interior of the tubing is such to bridge the gaps within the collars, and for this reason there is little, if any, tendency of the centering devices to expand into the gaps.

In the improved tubing caliper the feeler fingers collectively actuate a potentiometer having infinite resolution as distinguished from merely actuating a signaling device which will indicate whether one, two or three predetermined limits have been exceeded. By the use of a potentiometer of infinite resolution a very acurate profile of the interior of the tubing is capable of being recorded. With the usual recorder wherein a paper tape is moved beneath a recording pen at a speed commensurate with the speed with which the caliper is drawn through the tubing the paper will not ordinarily track with that precision required to accurately record the profile of the tubing by the actuated pen. Instead, the paper may shift in the course of its movement from side to side and consequently if reference lines or graph lines are printed on the paper tape the exact position of the profile line with relation thereto cannot be accurately ascertained because of the shifting of the paper in reference to the recorder.

It is, therefore, another object of the invention to provide a tubing calipering mechanism wherein a base line representative of the initial inside diameter of the tubing is drawn on the paper tape closely adjacent the profile line, also, if desired, an outside diameter line may be drawn on the paper tape closely adjacent the profile line. In this manner, even though the paper tape may shift laterally in the course of its movement relatively to the recorder the exact relationship of the profile line with respect to the initial inside diameter and with respect to the outside diameter can be easily and accurately ascertained.

It is another object of the invention to provide an averaging mechanism which can be used either independently of or in conjunction with the profile calipering tool which will make an instantaneous accurate record indicating what the average wall thickness is at any selected depth. When the average mechanism is employed in conjunction with the tubing calipering mechanism a profile record is obtained indicating not only the depth of wear or corrosion in the tubing but also the average depth of wear or corrosion around the entire interior of the tubing at the corresponding depth. From these two records it can be ascertained with reasonable accuracy whether wear or corrosion at any selected location in the tubing has resulted in only a few pits or depressions which will not materially weaken the tubing or whether the wear or corrosion extends around a large portion of the interior of the tubing so that the tubing is materially weakened thereby.

Another object of the invention is to provide a tubing calipering mechanism employing both a profile recording mechanism and an average recording mechanism wherein both instruments if used in conjunction with each other may be lowered into the tubing and withdrawn therefrom by the same single conductor cable. Plural conductor cables are of course known and have been used in conjunction with various instruments lowered into oil or gas wells. However, plural conductor cables are generally more expensive in initial cost and are difficult to maintain due to the likelihood of short circuits developing between the conductors of the plural conductor cable. For this reason, the ability to simultaneously transmit signals from the calipering mechanism and from the averaging mechanism over the same conductor of a single conductor cable is highly desirable.

With the foregoing and other objects in view, which will be made manifest in the following detailed description and specifically pointed out in the appended claims, reference is had to the accompanying drawings for an illustrative embodiment of the invention, wherein:

FIGURES 1A, 1B, and 1C, are, respectively, views in side elevation of the upper portion, the middle portion, and the bottom portion of the tubing calipering instrument embodying the present invention, the instrument being shown within a tubing and with a wiring diagram in conjunction therewith;

FIGS. 2A, 2B, 2C, 2D, 2E, 2F, 2G, 2H, and 2I are sectional views taken through portions of the instrument progressively from the top to bottom thereof, as depicted in FIGS. 1A, 1B, and 1C;

FIG. 3 is a view similar to FIG. 2F but showing the feeler fingers of the profiling portion of the tool as having been released;

FIG. 4 is a view similar to FIG. 2H, but illustrating the centralizing members of the tool as having been released;

FIG. 5 is a horizontal section taken substantially upon the line 5—5 upon FIG. 4;

FIG. 6 is a horizontal section taken substantially upon the line 6—6 upon FIG. 3 in the direction indicated;

FIG. 7 is a partial view in perspective illustrating the potentiometer and its associated structure and the manner in which it is actuated by its feeler fingers;

FIG. 8 is a horizontal section taken substantially upon the line 8—8 upon FIG. 2F; and FIG. 9 is a horizontal section taken substantially upon the line 9—9 upon FIG. 2B in the direction indicated.

Figure 2C:
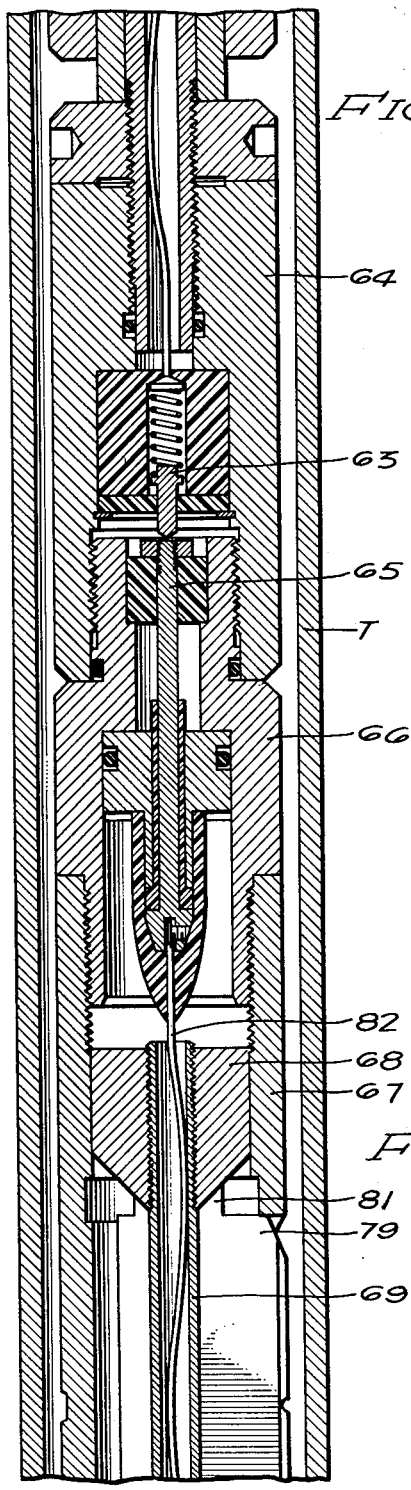

Referring to the accompanying drawings wherein similar reference characters designate similar parts throughout, the pipe or tubing to the calipered is indicated by the reference character T which may have been exposed to either or both mechanical wear, corrosion, or electrolytic action so that its internal walls are either pitted or grooved as illustrated in FIGS. 2B and 6. The instrument embodying the present invention is adapted to be lowered into the tubing T and withdrawn therefrom by means of a conductor cable 10 which, as previously explained, is preferably a single conductor cable. This conductor cable is connected to the body of the instrument by means of a rope socket 11. The conductor cable is shown as being unwound from a suitable winch 12 and as passing over pulleys 13 and under a measuring wheel 14 which measures the depth to which the instrument is lowered into the tubing T. This measuring instrument is mechanically connected such as through a flexible shaft 15 to a recorder 16. The winch 12 is equipped with brushes 17 and 18, one brush being electrically connected to the sheath of the cable which functions as an electrical ground and the other brush being electrically connected to the single conductor within the cable.

In the bottom of the rope socket 11 there is a central contact 19 urged downwardly by a compression spring 20, and this contact is electrically connected to the single conductor of the conductor cable 10. Contact 19 is engageable with a central contact 21 in a movable insulating body 22 that is urged upwardly by compression spring 23. Upward movement of the body of insulation is limited by a stop 24.

Around the central contact 21 there is a ring or jumper 25 that is engageable with contacts 26 and 27. The two contacts 26 and 27 which are bridge by the jumper are electrically connected to conductors 28 and 29, respectively, to an electric circuit which includes a battery 30. The circuit which includes the battery 30 is energized by the battery continuously while the instrument is in a well and the purpose of the jumper 25 is to automatically disconnect the battery when the instrument is withdrawn from a well and is not in use. This is accomplished by unscrewing and detaching the rope socket 11 from the body of the instrument which disconnects contact 19 from contact 21 and also allows spring 23 to move the body of insulation 22 upwardly, thus disengaging the jumper ring 25 from contacts 26 and 27. Conversely, when it is desired to use the instrument a mere application of the rope socket 11 automatically causes contact 19 to be electrically connected to contact 21 and to conductor 31 and causes the jumper 25 to electrically connect the two contacts 26 and 27.

The battery 30 is located in what may be termed an oscillator housing 32. In this housing there are disposed a transformer 33, a condenser 34, a temperature compensating resistor 35, a uni-junction silicon transistor 36, a NPN silicon transistor 37, condensers 165, 39, and 40, and a resistor 41 electrically connected together in the manner illustrated in the wiring diagram in FIG. 1A. The uni-junction silicon transistor 36, its shunting condenser 39 and source of current or battery 30 may be regarded as constituting the primary oscillator circuit having interposed between it and the transformer 33 a buffer amplifier comprising the condenser 40, NPN silicon transistor 37, resistance 41 and condenser 34. As illustrated in the diagram, conductor 31 is connected to one side of one winding of the transformer 33 which winding is adapted to conduct direct electric current from a lower battery 42, see FIG. 1C, to the conductor of the electric conductor cable 10. The other winding of the transformer, which is associated with the mentioned winding, merely cooperates therewith to form a type of coupler for coupling the output of the variable oscillator circuit to conductor 31. In this manner, direct current signals enregized by the battery 42 in the manner hereinafter explained, are transmitted to the conductor cable 10 through one winding of the transformer 33 without influencing or being influenced by the alternating current output of the oscilaltor circuit. On the other hand, alternating current signals which are energized by battery 30 in the manner hereinafter explained may be impressed on conductor 31 through the transformer.

A hollow shaft 43 is screwed and sealed in the bottom 44 of the oscillator housing 32 and is locked in position by a spanner nut 45. This shaft is surrounded by a sleeve 46 held in position by an anti-rotation screw 47 which serves to mount a ground of potentiometers 48, 49, 50, 51, and 52, see FIG. 1A, and one of which is illustrated in FIG. 2B. Between adjacent potentiometers there are push rods 53 which are urged downwardly by compression springs 54. There is one push rod associated with each potentiometer and each push rod has secured thereto a laterally extending finger 55 which is positioned beneath the push rod 56 of the potentiometer with which it is associated. The push rods 56 of the potentiometers 48, 49, 50, 51, and 52 are urged downwardly into engagement with their respective fingers 55 by coil compression springs 57, the potentiometers and push rods therefor are enclosed within a sealed sleeve 58. The lower end of each push rod 53 is engageable with a pivotally mounted feeler finger 59 which is pivoted as indicated at 60, so that the feeler fingers 59 will all be urged to swing outwardly by the effects of the compression springs 54 on the push rods 53 to engage the interior of the tubing T.

It will be appreciated, that with this arrangement, when any one of the feeler fingers 59 is permitted by the tubing T to swing outwardly, this permits its push rod 53 to descend and the laterally extending finger 55 also to descend. Consequently, the push rod 56 of the potentiometer associated therewith will be caused to descend under the action of spring 57 and the resistance of the potentiometer will be varied accordingly.

The potentiometers employed preferably are of the infinite resolution type so that the resistances thereof will vary smoothly in accordance with the expansion or outwardly swinging movements of their respective fingers 59. If only one finger 59 is permitted to swing outwardly only one of the resistances indicated at 48, 49, 50, 51, and 52 in FIG. 1A will be affected thereby. However, if more than one or all of the fingers 59 are permitted to swing outwardly more than one or all of the resistances indicated at 48, 49, 50, 51, and 52 in FIG. 1A will be affected thereby. Altering one or more of these resistances has the effect of altering the frequency of the oscillator circuit, the output of which is impressed on conductor 31 and consequently, on the conductor of the conductor cable 10 through the coupling transformer 33. Consequently, it will be appreciated that the signal output of the oscillator circuit has its frequency modified in proportion to the total adjustment of all of the potentiometers or resistances 48, 49, 50, 51, and 52. Consequently, if only one finger 59 swings outwardly the frequency of the output of the oscillator circuit is modified only to a slight extent. Conversely, if all of the fingers 59 are permitted to swing outwardly the frequency of the output of the oscillator circuit will be modified commensurate therewith.

During the descent of the instrument into the tubing T the feeler fingers 59 are temporarily locked in their innermost positions as shown in FIG. 2B by a trip cup 61 equipped with trip wires 62 that are directed upwardly and which slightly engage the interior of the tubing T. This trip cup is used to hold the feeler fingers 59 in their innermost positions so as to reduce wear thereon during descent. When the instrument has been lowered at the desired depth and is started on its withdrawal movement, the ends of the trip wires 62 engage in the gap that is normally present inside of a tubing collar and forcibly cause the trip cup to descend relative to shaft 43, thus releasing the feeler fingers for engagement with the interior of the tubing.

Conductor 31 extends downardly through the hollow shaft 43 and is electrically connected to a spring-actuated contact 63 in a bottom sub 64 that is adapted to engage a contact 65 in an adapter 66, see FIG. 2C.

An upper centralizer housing 67 is threadedly attached to the adapter within which there is an upper downwardly directed cone or expander 68 that is threadedly mounted on a hollow shaft 69. On the lower end of this hollow shaft there is threadedly mounted a trip lock 70 that is disposed within a trip cup 71 that has one or more trip wires 72 secured thereto which extend outwardly through slots 73 in the centralizer housing and which are directed upwardly. The trip lock has an upstanding finger 74 which carries a detent 75 engageable in a groove 76 in a lower cone or expander 77 that faces upwardly. A coil compression spring 78 is compressed between the lower cone 77 and the trip lock 70.

Between the two cones 68 and 77 there are runners or centralizing members 79 which are projectable outwardly through slots 80 in the upper centralizer housing. Outward movement of these runners or centralizing members is limited by extensions 81 thereon which are engageable with the interior of the housing 67.

Figure 2D:
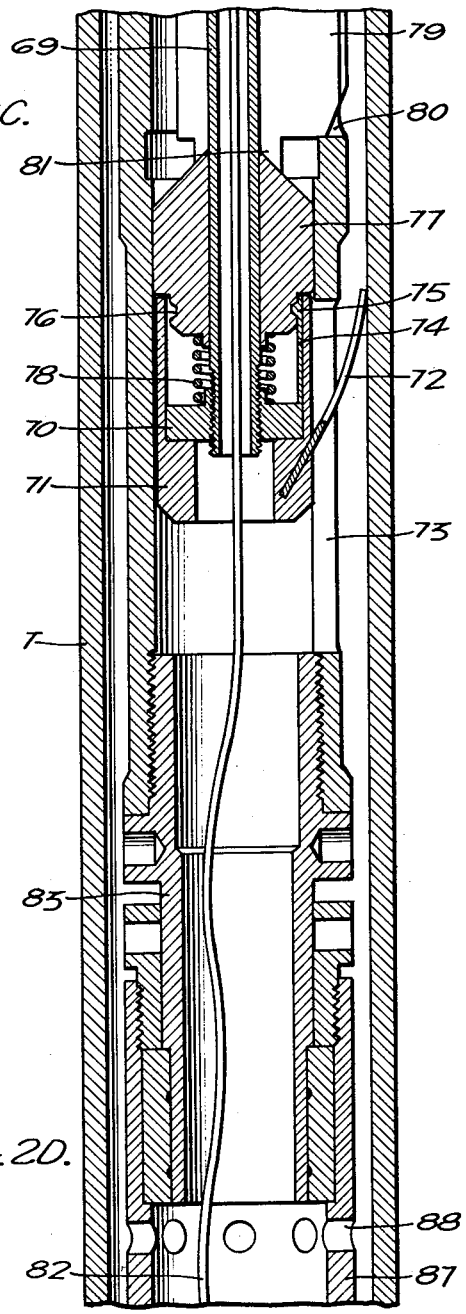

The centralizer is lowered into the well in the position shown in FIGS. 2C and 2D wherein the trip lock 70 serves to hold the lower cone 77 in a predetermined position with relation to the trip lock. However, when the instrument is pulled upwardly in the tubing T and the wire or wires 72 engage in the gap between adjacent tubing sections within a collar, the trip cup 71 is forced downwardly relative to the trip lock 70 within the centralizer housing 67. Downward movement of the trip cup 71 with relation to the trip lock 70 exposes or releases finger 74 so that the compression spring 78 is then effective to cause the lower cone 77 to disengage the detent 75 on finger 74. In so doing, the finger 74 is merely flexed outwardly. The spring 78 not only urges the cone 77 upwardly but is also effective to urge the trip lock 70, the hollow shaft 69, and the upper cone 68 downwardly. These cones consequently become effective on the inner corners of the runners or centralizing members 79 to urge the centralizing members outwardly into engagement with the interior of the tubing. As the runners or centralizing members are equally arranged around the two cones 68 and 77 they are urged outwardly thereby with equal efforts, and as a result thereof, these centralizing members tend to center the instrument within the tubing T. As the instrument is drawn upwardly through the tubing it will be noted that the runners or centralizing members present rather lengthy edges or surfaces that bear against the interior wall surface of the tubing. Consequently, wear will be evenly distributed thereover, and because of the lengths of these edges or surfaces, they are not influenced to any marked extent when they traverse pits or depressions in the wall of the tubing including the gaps between adjacent tubing sections that occur within tubing collars.

A conductor 82 is electrically connected to contact 65 and extends downwardly through the hollow shaft 69. This conductor, in effect, constitutes a continuation of conductor 31 and the conductor within the conductor cable 10. It extends down through a coupling 83 to a sealed connector 84, see FIG. 2E, which is mounted on top of a standpipe 85. The standpipe 85 is mounted on top of a sub 86 and an apertured boot housing 87 having apertures 88 connects the sub 86 with the coupling 83. Within the boot housing there is secured around the standpipe 85 a flexible boot 89 which serves to equalize the hydrostatic pressure existing on the exterior of the tool with internal pressure of a column of clean liquid such as a liquid silicone. The top of the column of silicone liquid is confined by the flexible boot 89.

The boot 89 may be formed of rubber preferably synthetic. It has been found, however, that when tools of this general character have rubber diaphragms or rubber boots for equalizing external pressures with internal pressures and are subjected to high pressures of hydrocarbon gases, such as those encountered in oil and gas wells, that the gases migrate through the rubber and become entrapped inside of the tool. Consequently, unless these entrapped gases are relieved, if the tool is quickly withdrawn from the well, the entrapped gases will abnormally expand the rubber boot or otherwise injure the instrument. For this reason the top of the standpipe 85 is equipped with an outlet in which is formed a valve seat 91 for a downwardly closing ball check valve 92 which is urged against its seat by a small coil compression spring 93 above which there is a filter 94. By this construction, if the gases are forced through or otherwise penetrate the interior of the tool through the boot 89 or otherwise, these entrapped gases can escape from the interior of the instrument past the check valve 92, and through the filter 94. Filter 94 may be regarded as somewhat optional, its primary purpose being to prevent dirt from settling around check valve 92 which might prevent a proper seating of the check valve.

Conductor 95 which is connected to the sealed connector 84, extends downwardly through the standpipe 85 and through a hollow shaft 96 which is threaded into the sub 86 and is equipped with a nut 97. This conductor is electrically connected to the slide, not shown, of a potentiometer 98, see FIG. 2F. One side of the potentiometer 98 is grounded. The other side of the potentiometer is electrically connected by conductor 99 through a sealed connector 100, see FIG. 2G, to one side of a battery 42, see FIG. 2I, the other side of which is grounded as indicated at 102. The potentiometer 98 has its slide actuated by a vertically slidable push rod 103, see FIG. 2F, and FIG. 3, that is urged upwardly by a coil compression spring 104. Wired in this manner the potentiometer, in effect, functions as a voltage divider for the output of the battery 42 as indicated by the wiring diagram portion of FIG. 1C. The battery 42 is disposed within a battery case 105 which is removably held in place in the battery case housing 106 by a split removable retaining ring 106. Preferably, set screws 108 are tightened through the battery case housing against the battery case 105 to assure a good ground between the battery case and the body of the tool. The battery case 105 has a removable top 109 enabling the battery 42 to be replaced as occasion may require. When the tool is not in use, the battery should be disconnected, and to this end, the battery case housing 106 has openings 110 in the wall thereof through which the plug 111 of the sealed connector on top of the battery case can be disconnected.

On the hollow shaft 96 there is a sleeve 112 and beneath this sleeve there is a finger-supporting collar 113 which is held against the bottom of sleeve 112 by means of a collar 114 and set screw 115. The finger-supporting collar 113 has a multiplicity of radial grooves in the exterior thereof in which are disposed feeler fingers 116. These feeler fingers have a split pivot ring 117 threaded therethrough which is received in a groove in the top of the feeler finger-supporting collar 113. The pivot ring is confined in the groove on top of the collar 113 by portions of the sleeve 112 that are disposed thereover. Each feeler finger has its upper end engaged by the lower end of an inner leaf spring 118 which is somewhat longer than an outer leaf spring 119. Both of the leaf springs 118 and 119 are biased to press inwardly. They have their upper ends bent inwardly as indicated at 120, see FIG. 2E, between the top of sleeve 112 and the underside of nut 97. While a single spring for each feeler finger 116 might suffice, the use of inner and outer leaf springs 118 and 119 is preferable to obtain the desired stiffness of spring to urge the feeler fingers 116 outwardly.

The lower ends of the feeler fingers 116 have retaining portions 121 formed thereon which, when they are within the steeply inclined surface 122, serve to retain the feeler fingers in their collapsed positions as indicated in FIG. 2F. The surface 122 is formed on the interior of a potentiometer actuator 124 which outwardly of the steeply inclined surface 122 presents a flatter inclined surface 125 which is adapted to be traversed by the retaining portions 121 when the feeler fingers 116 are permitted to swing outwardly.

A nut 126 is threaded into the potentiometer actuator and is utilized for two purposes, one, to adjust the effective position of the potentiometer actuator 124 with relation to the potentiometer push rod 103; and two, to clamp the lower edge of a rubber diaphragm seal 127 that is wired or otherwise secured onto hollow shaft 96.

It will be appreciated that, when the feeler fingers 116 are released from surface 122 and are arranged to traverse surface 125, the farther the feeler fingers 116 are permitted to swing outwardly under the action of the springs 118 and 119, the greater distance the potentiometer actuator 124 will be depressed. This movement is transmitted to the push rod 103 of the potentiometer which, in turn, transmits the movement to the potentiometer slide, thus altering the position of the slide with respect to the potentiometer. This potentiometer 98 is also preferably of the type having infinite resolution.

In order to facilitate vertical movement of the potentiometer actuator 124, this actuator is provided with a downwardly extending cylindrical extension 128 and between this extension and the hollow shaft 96 there is an anti-friction bearing shown as comprising upper and lower sets of balls 129 that are held within a ball retainer 130. The ball retainer encircles the shaft 96 except for that part of the circumference of the shaft that is occupied by the potentiometer 98. It is held against being materially displaced from this position by means of a set screw 131. The potentiometer actuator 124 is held against rotation relative to shaft 96 by means of a pressed dowel 132 that is pressed into the shaft and slides in a keyway formed in a bushing 133 into which is screwed a nut 134 that tightens against a portion of the rubber seal 135 that is also wired onto shaft 96.

Below the cylindrical extension 128 on the potentiometer actuator 124 there is an inner trip sleeve 136 telescopically slidable on the shaft 96. This inner trip sleeve has its upper end arranged to abut the bottom of the cylindrical extension 128. It is urged downwardly by a coil compression spring 137 that is compressed between an internal shoulder on the inner trip sleeve 136 and nut 134.

There are three strip levers, only one of which is illustrated at 138. These trip levers are at equally spaced intervals around the inner tip sleeve 136 and are loosely pivoted to the inner trip sleeve 136 by a split pivot ring 139. The lower end of each trip lever presents an inclined surface 140 engageable with a lip 141 on nut 142. When in engagement with the lip 141 the trip levers 138 have their upper ends engageable with the tops of the slots in the inner trip sleeve 136, thus holding the inner trip sleeve in its upper position against the action of the compression spring 137. Above each inclined surface 140 each trip lever 138 presents a downwardly and outwardly inclined surface 143 engageable by the bottom of an outer trip sleeve 144 that telescopes relatively to the inner trip sleeve 136.

The outer trip sleeve is internally grooved or internally relieved as at 145 so that the heads 146 may partially enter this relieved or grooved portion when the outer trip sleeve 144 moves downwardly relatively to the inner trip sleeve. The outer trip sleeve is equipped with upwardly extending trip wires 147 which are engageable in the gap between adjacent tubing sections and within a tubing collar in the manner illustrated in FIG. 3. When the trip wires 147 engage in the gap as illustrated in FIG. 3, the outer trip sleeve 144 is caused to descend relatively to the inner trip sleeve 136 engaging the inclined surface 143 and causing the trip levers 138 to have their lower ends cammed inwardly. The swinging of the trip levers about the pivot ring 139 causes their upper heads 146 to enter the groove 145 during the descent so that the lower ends of the trip levers can pass by the lip 141 on the nut 142. The disengagement of the lower ends of the trip levers 138 with lip 141 enables the inner trip sleeve 136 to descend under the action of spring 137 and this descent causes the top heads 146 on the trip levers to be cammed back out of groove 145 to swing the lower ends of the trip levers outwardly beneath lip 141 as illustrated in FIG. 3. The descent of the inner trip sleeve 136 thus frees the potentiometer actuator 124 for downward movement in response to outward swinging movement of feeler fingers 116. This downward movement of the potentiometer actuator 124 is limited by the engagement of the bottom of cylindrical extension 128 with the top of the inner trip sleeve 136 so that the retaining portions 121 can never move outwardly beyond the outer edge of surface 125. Downward movement of the inner trip sleeve 136 is of course limited by the outer trip sleeve 144 which, as shown in FIG. 3, is then in engagement with the lip 141 on the nut 142. Adjustment of the potentiometer actuator with relation to the fingers 116 is consequently accomplished by screwing nut 142 upwardly or downwardly with relation to the shaft 96.

When it is desired to reset the tool after the outer trip sleeve 144 has once descended, this is accomplished by raising the inner trip sleeve 136 relative to the outer trip sleeve 144 until inclined surface 140 is again over the top of lip 141 and thereafter raising the outer trip sleeve 144 relatively to the inner trip sleeve. The pivotal connection between the trip levers 138 and the pivot ring 139 is somewhat loose or sloppy to permit this action to take place.

Below nut 142 there is a sub 148 into which the shaft 96 is threaded. This sub, in turn, is threaded into a sleeve 149 which is connected as indicated at 150 to a lower runner housing 151 which is a duplicate of runner housing 67. This lower runner housing contains runners 152 which are expandable through slots 153 by means of upper and lower cones 154 and 155 which are released for movement towards each other under the action of coil spring 156 when the trip cup 157 is pushed downwardly by its trip wires 158 to permit the detent 159 to release the lower cone 155.

The runner housing 151 is extended downwardly to provide the battery case housing 106 which houses the battery 42 and its case 105. The lower end of the battery case is equipped with a "stinger" 160 that is of slightly greater overall diameter than the remainder of the tool. The "stinger" is held in position by shear pins 161 which are held in place by set screws 162. The purpose of this "stinger" is that, in the event that the instrument should encounter partially collapsed tubing or any other object in the well which might tend to wedge or lock the instrument therein, the "stinger" 160 will be the first to encounter such object and if it becomes immovably lodged in the tubing T for any reason a strong upward pull on the instrument will cause the shear pins 161 to shear, allowing the battery case housing 106 to be pulled therefrom and the tool to be recovered.

The output of battery 42 as modified by potentiometer 98 functioning as a voltage divider which, in turn, is controlled by the expansion of one or more feeler fingers 116, is transmitted through ground and through the conductor cable 10 to a direct current amplifier 163 and the output of this amplifier is fed into and operates one of the pens of the recorder 16 to produce a line indicated at 164. Preferably, a condenser 165 is connected between the slider of potentiometer 98 and the transformer 33 to ground, but the use of this condenser is optional.

The output of the oscillator circuit which is impressed on the line through coupling transformer 33 is also transmitted by the conductor of conductor cable 10 and by ground to a frequency meter 166. A condenser 167 is arranged ahead of the frequency meter to isolate the frequency meter from the direct current from battery 42. The frequency meter is of the conventional type wherein input frequency is converted to direct current output and rectification is an inherent internal function of the meter. The output of the frequency meter 166 is connected to a direct current amplifier 168 and is also supplied to the recorder 16 to actuate a pen which draws line 169. Line 169 is of course representative of the expansion of the feeler fingers 59 which are located above and are therefore somewhat in advance of feeler fingers 116 as the instrument is withdrawn from the hole. This is compensated for in the recorder 16 by arranging the pen which draws the line representative of average depth slightly behind the pen which draws line 164 representative of profile. In this manner, on any transverse line across the paper tape that is moved beneath the pens the profile of a corresponding location in the tubing will be indicated and the average depth determined by feeler fingers 59 is also indicated. The paper tape that is ordinarily used in recording instruments of this character frequently wanders from side to side of the instrument in the course of its movement by the flexible shaft 15. Consequently, we prefer to arrange on the recorder 16 a pen which is stationary with respect to the recording instrument which will draw a base line 170 representative of the nominal or initial wall surface of the tubing.

A similar stationary pen may be arranged in the recording instrument to draw a second base line 171 that may be representative of the nominal or exterior surface of the tubing. In this manner, even though the paper tape may wander or shift from side to side in the course of its movement, base lines are drawn on the tape from which any point on the lines 164 and 169 can be accurately located.

*Operation*

The instrument is lowered into the well in the position shown in FIGS. 2A to 2I, inclusive. During the descent of the instrument trip wires 62, 72, 147, and 158 merely slide as they are drawn downwardly in the well by the weight of the instrument. When the instrument has reached bottom or the desired depth to which it is desired to caliper the tubing, it is drawn upwardly and the movement of the paper tape in the recording instrument 16 is started.

Upper trip wires 62 arrest upward movement of the trip cup 61, effecting a release of the averaging feeler fingers 59, each of which actuates its own potentiometer 48, 49, 50, 51, or 52. The arresting of the upward movement of the trip wires 72 and 158 effects a release, and consequent expansion of the upper and lower centralizers provided by the upper runners 79 and lower runners 152 which centralize the tool with relation to the tubing. The arresting of upward movement of the trip wires 147 effects a release and consequent expansion of feeler fingers 116.

As the instrument is drawn upwardly through the tubing the expansion of one or more of the feeler fingers 116 occasioned by these feeler fingers entering a pit, depression or annular groove in the tubing, brings about a downward movement of the potentiometer actuator 124 which adjusts the potentiometer 98 in accordance therewith and causes the pen which draws line 164 to be varied accordingly. If a single feeler finger 116 enters a single pit or depression, the potentiometer actuator 124 actuates potentiometer 98 to the same extent as all of the feeler fingers expanding into an annular groove of the same depth. For this reason, it is impossible to determine from line 164 whether a change in this line is representative of a single finger 116 entering a single pit or depression or whether a plurality of fingers 116 have entered an annular groove in the tubing of the same depth. However, when feeler fingers 59 traverse the same location in advance of the feeler fingers 116, each feeler finger 59 actuates its own potentiometer indicated respectively at 48, 49, 50, 51, and 52. If only a single finger 59 has expanded into a pit or depression the total resistance of the oscillator circuit is affected to only a minor extent, and consequently the change in frequency impressed on the conductor of the conductor cable is small, resulting in only a small variation in line 169. On the other hand, if the feeler fingers 59 traverse an annular groove such as in the case of ring corrosion all feeler fingers 59 will be permitted to expand. Each of their potentiometers will consequently be affected and the total resistance in the oscillator circuit will be materially affected, producing a large variation in line 169.

A comparison and an analysis of the two lines 164 and 169 will indicate whether a section of tubing has only been pitted at a single isolated locality and does not require immediate replacement, or whether the tubing has corroded away around a substantial portion of its interior so that it has become so weakened in wall thickness that immediate replacement or other remedial steps are necessary.

While variations in the expansion of feeler fingers 116 passing over consecutive pits or depressions will produce a type of pulsating direct current in the conductor of the conductor cable, this frequency or variation is quite low, not exceeding 200 cycles per second. The output of the oscillator circuit is definitely beyond this range having a frequency variation that will vary from 3000 to 8000 cycles per second.

It will be appreciated that, depending upon the information that is desired, either part of the caliper may be run independently. Thus, it is possible to connect the rope socket 11 directly to adapter 66 when the only information desired or required is merely the maximum depth at any location in the tubing. Usually, however, both parts of the instrument are used together. One part of the instrument to a certain extent serves as a check on the other. In other words, if the profile portion of the apparatus sensed by feeler fingers 116 should malfunction, this can be determined from a comparison of lines 164 and 169 as to the depth where malfunctioning occurred. Consequently, it is only necessary to rerun the instrument from the indicated depth after the malfunctioning has been corrected. Conversely, if the averaging part of the instrument should malfunction, a comparison of the two lines 164 and 169 will indicate the depth at which such malfunctioning occurred, requiring only that the instrument be rerun in the tubing from that depth.

Typical values of the parts employed are as follows:

| | |
|---|---|
| Transistor 36 | Uni-junction silicon. |
| Transistor 37 | NPN silicon. |
| Condenser 39 | .047 microfarad. |
| Condenser 40 | .002 microfarad. |
| Condenser 34 | .01 microfarad. |
| Resistance 41 | 68K. |
| Resistances 48, 49, 50, 51, 52 | 1K each. |
| Condenser 165 | .5 microfarad. |
| Battery 42 | 9 volts. |
| Potentiometer 98 | 1330 ohms. |
| Battery 30 | 9 volts. |

Various changes may be made in the details of construction without departing from the spirit and scope of the invention as defined by the appended claims.

We claim:

1. In combination, calipering means for determining the maximum internal size of a pipe or tube about an internal transverse circumference thereof, and means for determining the average internal size of the tube about the transverse internal circumference thereof at the location where the maximum internal size is determined.

2. In combination, calipering means adapted to be moved through a pipe or tube for determining the maximum internal size thereof about an internal transverse circumference thereof, and means associated therewith for determining the average internal size of the pipe or tube about its transverse internal circumference at the location where the maximum internal size is determined.

3. In combination, a single conductor cable adapted to be lowered into and withdrawn from a pipe or tube, a plurality of feeler fingers carried thereby and urged outwardly into engagement with the pipe or tube, means for applying a direct current to the conductor cable, variable resistance means in circuit with the conductor cable and varied in accordance with the maximum distance to which any one of the fingers is moved outwardly as permitted by the pipe or tube, a second set of fingers carried by the conductor cable and urged outwardly into engagement with the pipe or tube, means for applying an alternating current of variable frequency to the conductor cable, and means associated with each finger of the second set of fingers for contributing its variations in the frequency of the alternating current whereby variations in the direct current applied to the conductor cable will indicate the maximum distance to which any finger of the first-mentioned set has moved outwardly, and variations in the frequency of the alternating current will indicate the total of the distances to which all of the fingers of the second set have moved outwardly.

4. In combination, a single conductor cable adapted to be lowered into and withdrawn from a pipe or tube, a plurality of feeler fingers carried thereby and urged outwardly into engagement with the pipe or tube, means for applying a direct current to the conductor cable, variable resistance means in circuit with the conductor cable and varied in accordance with the maximum distance to which any one of the fingers is moved outwardly as permitted by the pipe or tube, a second set of fingers carried by the conductor cable and urged outwardly into engagement with the pipe or tube, means for applying an alternating current of variable frequency to the conductor cable, and means associated with each finger of the second set of fingers for contributing its variations in the frequency of the alternating current, indicating means connected to the conductor cable for indicating variations in the direct current in the conductor cable, and indicating means connected to the conductor cable for indicating variations in the frequency of the alternating current applied thereto.

5. In combination, a conductor cable having a single conductor adapted to be lowered into and withdrawn from a pipe or tube, a plurality of outwardly urged feeler fingers carried thereby, means responsive to the maximum distance to which any finger has moved outwardly as permitted by the pipe or tube for applying one type of electric current to the conductor of the conductor cable indicative of the extent to which the finger has moved outwardly the greatest distance moved, a second set of outwardly urged fingers carried by the conductor cable, and means for applying to the conductor of the conductor cable a distinguishable type of electric current indicative of the distances to which all of the fingers of the second set moved outwardly.

6. In combination, a conductor cable having a single conductor adapted to be lowered into and withdrawn from a pipe or tube, a plurality of outwardly urged feeler fingers carried thereby, means responsive to the maximum distance to which any finger has moved outwardly as permitted by the pipe or tube for applying one type of electric current to the conductor of the conductor cable indicative of the extent to which the finger has moved outwardly the greatest distance moved, a second set of outwardly urged fingers carried by the conductor cable, means for applying to the conductor of the conductor cable a distinguishable type of electric current indicative of the distances to which all of the fingers of the second set moved outwardly, and means connected to the conductor cable for distinguishing and indicating the variations of both types of current.

7. In a tubing caliper, a shaft, a plurality of feeler fingers pivotally supported by the shaft, a spring urging each finger outwardly, a cone slidable relatively to the shaft presenting a conical surface engageable by the fingers and adapted to be moved axially on the shaft as the fingers expand into engagement with the interior of a tubing, a potentiometer having a slide operatively connected to the cone so as to be responsive to changes in position thereof, a battery connected to the ends of the potentiometer and means for recording positions assumed by the slide of the potentiometer electrically connected to the slide and one end of the potentiometer.

8. In combination, a conductor cable adapted to be lowered into a tubing, a plurality of outwardly urged fingers carried by the conductor cable adapted to engage the interior of the tubing, means for energizing the conductor cable with electric current effected by the maximum outward movement of one or more of the fingers to indicate the maximum depth of a depression in the tubing, and means for energizing the conductor cable with a distinguishable electric current controlled by a plurality of fingers to indicate the average of the depth in the wall of the tubing on a circumference at the location of the depression of maximum depth.

9. A tubing caliper comprising a conductor cable adapted to be lowered into a tubing, a plurality of fingers mounted thereon and urged outwardly to engage the interior of a tubing, a variable resistor having a slide, means for moving the slide by the outward movements of one or more fingers, means for supplying an electric potential across the ends of the variable resistor, the conductor cable being arranged in a circuit including the slide and one end of the variable resistor, and means at the upper end of the conductor cable for determining the position of the slide on the variable resistor and consequently the extent to which the fingers have moved outwardly.

10. A tubing caliper comprising a conductor cable adapted to be lowered into a tubing, a plurality of fingers mounted thereon and urged outwardly to engage the interior of a tubing, a variable resistor having a slide, means for moving the slide by the outward movements of one or more fingers, means located adjacent the variable resistor and the fingers for supplying an electric potential across the ends of the variable resistor, the conductor cable being arranged in a circuit including the slide and one end of the variable resistor, and means at the upper end of the conductor cable for determining the position of the slide on the variable resistor and consequently the extent to which the fingers have moved outwardly.

11. A tubing caliper comprising a conductor cable adapted to be lowered into a tubing, a plurality of fingers carried thereby urged outwardly into engagement with the interior of the tubing, a variable resistance associated with each finger whose resistance varies with the extent to which the finger moves outwardly, said resistances being connected in series with each other and across an oscillator circuit including a source of direct current energizing a uni-junction silicon transistor shunted by a condenser, said oscillator circuit being electrically connected to the conductor cable.

12. A tubing caliper comprising a conductor cable adapted to be lowered into a tubing, a plurality of fingers carried thereby urged outwardly into engagement with the interior of the tubing, a variable resistance associated with each finger whose resistance varies with the extent to which the finger moves outwardly, said resistances being connected in series with each other and across an oscillator circuit including a source of direct current energizing a uni-junction silicon transistor shunted by a condenser and located in the vicinity of the fingers.

13. A tubing caliper comprising a conductor cable adapted to be lowered into a tubing, a plurality of fingers carried thereby urged outwardly into engagement with the interior of the tubing, a variable resistance associated with each finger whose resistance varies with the extent to which the finger moves outwardly, said resistances being connected in series with each other and across an oscillator circuit including a source of direct current energizing a uni-junction silicon transistor shunted by a condenser, and a buffer amplifier connected across the oscillator circuit and electrically connected to the conductor cable.

14. A tubing caliper comprising a conductor cable adapted to be lowered into a tubing, two sets of expansible fingers carried thereby adapted to expand into engagement with the interior of the tubing, means electrically connected through the conductor cable to the fingers of one set for indicating at the top of the conductor cable the maximum distance that one or more fingers of the mentioned set has expanded, and means electrically connected through the conductor cable to the fingers of the other set for indicating the average distance to which the fingers of said other set have expanded.

15. A tubing caliper comprising a conductor cable adapted to be lowered into a tubing, two sets of expansible fingers carried thereby adapted to expand into engagement with the interior of the tubing, means electrically connected through the conductor cable to the fingers of one set for recording the maximum distances to which one or more fingers of one set have expanded as they are drawn through the tubing, and means electrically connected through the conductor cable to the fingers of the other set for making a comparable record of the average distance to which the fingers of said other set have expanded as they are drawn through the tubing by the conductor cable whereby by comparing the records for a selected location in the tubing it may be ascertained whether the expansion of one or more fingers of the first-mentioned set is occasioned by an isolated depression in the tubing wall or whether it extends materially around the internal circumference of the tubing.

16. A tubing caliper comprising a conductor cable adapted to be lowered into a tubing, means adapted to be suspended thereby and electrically connected therethrough for determining the maximum depth of a depression in the interior surface of a tubing wall, and means suspended by the conductor cable and electrically connected therethrough for determining the average depth of the depression about an internal circumference of the tubing at the location where maximum depth of depression is indicated.

17. A tubing caliper comprising a conductor cable having a single conductor adapted to be lowered into a tubing, means adapted to be suspended thereby and electrically connected therethrough for determining the maximum depth of a depression in the interior surface of the tubing wall, and means suspended by the conductor cable and electrically connected therethrough for determining the average depth of the depression about an internal circumference of the tubing at the location where maximum depth of depression is indicated.

18. In combination, a conductor cable adapted to be lowered into a tubing, a first means carried by the conductor cable for measuring the maximum depth of a depression in the wall of the tubing on an internal circumference thereof, a second means carried by the conductor cable for measuring the average depth in the wall of the tubing at the mentioned circumference, means for energizing the conductor cable with distinguishable electric currents, means by which the first means modifies one of said currents in accordance with the measurement made by the first means, means by which the second means modifies the other of said currents in accordance with the measurement made by the second means, and means for ascertaining from said currents the values of the maximum depth and of the average depth of the depression at the mentioned circumference.

19. In combination, a single conductor cable adapted to be lowered into a tubing, a first means carried by the conductor cable for measuring the maximum depth of a depression in the wall of a tubing on an internal circumference thereof, a second means carried by the conductor cable for measuring the average depth in the wall of the tubing at the mentioned circumference, means for energizing the single conductor of the conductor cable with distinguishable electric currents, means by which the first means modifies one of said currents in accordance with the measurement made by the first means, means by which the second means modifies the other of said currents in accordance with the measurement made by the second means, and means for ascertaining from said currents the values of the maximum depth and of the average depth of the depression around the mentioned circumference.

20. In combination, a single conductor cable adapted to be lowered into a tubing or the like, a first means for measuring the maximum depth of a depression in the wall of the tubing on a transverse internal circumference thereof, a second means carried by the conductor cable for measuring the average depth in the wall of the tubing on a transverse circumference thereof, means for energizing the single conductor cable with distinguishable electric currents, means by which the first means modifies one of said currents in accordance with measurements made by the first means, means by which the second means modifies the other of said currents in accordance with measurements made by the second means, and means for recording the changes in values of said currents as said first and second means are moved through the tubing whereby from a comparison of the records made the relationship between the maximum depth recorded from the first means and the average depth recorded from the second means the condition of the tubing can be ascertained for any transverse circumference of the tubing.

References Cited in the file of this patent

UNITED STATES PATENTS

| | | |
|---|---|---|
| 2,145,336 | Boyd | Jan. 31, 1939 |
| 2,267,110 | Kinley et al. | Dec. 23, 1941 |
| 2,514,355 | Barnes | July 11, 1950 |
| 2,544,609 | McMahan | Mar. 6, 1951 |
| 2,615,779 | Chaney et al. | Oct. 28, 1952 |
| 2,630,632 | Brandon | Mar. 10, 1953 |
| 2,638,681 | Kinley et al. | May 19, 1953 |
| 2,656,613 | Goble | Oct. 27, 1953 |
| 2,695,456 | Roberts | Nov. 30, 1954 |
| 2,695,820 | Segesman | Nov. 30, 1954 |
| 2,721,110 | Price | Oct. 18, 1955 |
| 2,766,533 | Brandon | Oct. 16, 1956 |
| 2,771,685 | Kinley | Nov. 27, 1956 |
| 2,786,276 | Lusk | Mar. 26, 1957 |
| 2,854,758 | Owen | Oct. 7, 1958 |
| 2,875,525 | Freed | Mar. 3, 1959 |

FOREIGN PATENTS

| | | |
|---|---|---|
| 553,791 | Great Britain | June 7, 1943 |

OTHER REFERENCES

Publication: Amer. Mach., May 23, 1946, pages 134, 135. (Copy in Library.)